US009268477B2

(12) United States Patent
Lai et al.

(10) Patent No.: US 9,268,477 B2
(45) Date of Patent: Feb. 23, 2016

(54) PROVIDING CONTEXTUAL MENUS

(71) Applicant: Citrix Systems, Inc., Fort Lauderdale, FL (US)

(72) Inventors: Jannie Lai, Monte Sereno, CA (US); Dai Tang, San Mateo, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 208 days.

(21) Appl. No.: 13/897,539

(22) Filed: May 20, 2013

(65) Prior Publication Data

US 2014/0344738 A1 Nov. 20, 2014

(51) Int. Cl.
*G06F 3/048* (2013.01)
*G06F 3/0486* (2013.01)
*G06F 17/24* (2006.01)
*G06F 3/0482* (2013.01)
*G06F 9/44* (2006.01)

(52) U.S. Cl.
CPC ............ *G06F 3/0486* (2013.01); *G06F 3/0482* (2013.01); *G06F 9/4443* (2013.01); *G06F 17/243* (2013.01)

(58) Field of Classification Search
CPC ....... G06F 3/0486; G06F 8/00; G06F 3/0482; G06F 17/243; G06F 9/4443
See application file for complete search history.

(56) References Cited

U.S. PATENT DOCUMENTS

| 5,715,413 | A | 2/1998 | Ishai et al. | |
|---|---|---|---|---|
| 7,085,736 | B2* | 8/2006 | Keezer | G06Q 30/0641 705/27.1 |
| 7,503,009 | B2* | 3/2009 | Peters | G06F 3/0481 715/764 |
| 2002/0021310 | A1 | 2/2002 | Nakai et al. | |
| 2006/0048062 | A1* | 3/2006 | Adamson | 715/760 |
| 2007/0245263 | A1* | 10/2007 | Hale et al. | 715/810 |
| 2008/0184141 | A1* | 7/2008 | Selig | G06F 17/243 715/762 |
| 2010/0332378 | A1* | 12/2010 | Mauro et al. | 705/37 |
| 2012/0054613 | A1* | 3/2012 | Yoo | G06F 3/165 715/716 |
| 2012/0096379 | A1* | 4/2012 | Bell | G06F 3/0486 715/769 |

OTHER PUBLICATIONS

J. Beer and J. K. Yamakawa, Architecture for a Graphical Navigation Aid, Jul. 1, 1994, IBM Technical Disclosure Bulletin, vol. 37, No. 07.*
Lin et al., Application-objected Workflow Management System based on Abstract Service; © 2009; IEEE; pp. 144-152.*

(Continued)

*Primary Examiner* — Linh K Pham
(74) *Attorney, Agent, or Firm* — Banner & Witcoff, Ltd.

(57) ABSTRACT

Methods, systems, and computer-readable media for providing contextual menus are presented. In some embodiments, a computing device may receive user input. Subsequently, the computing device may determine, based on the received user input, that a drag-and-drop operation has been completed, where the drag-and-drop operation includes at least one item being dragged from a source palette to a target palette. In response to determining that the drag-and-drop operation has been completed, the computing device may cause a contextual menu associated with the at least one item to be displayed. In some arrangements, the contextual menu may be a configuration menu. Additionally or alternatively, causing the contextual menu to be displayed may include animating the contextual menu as a panel that slides into view from at least one edge of a displayed user interface.

20 Claims, 12 Drawing Sheets

(56) References Cited

OTHER PUBLICATIONS

Kubalski et al., ObjectWorks Interaction Model—Integrating Multiple Views; © 1993; IEEE; pp. 176-182.*

"Drag/Drop of Icons to/from Containers for Installing/Removing," IBM Technical Disclosure Bulletin, International Business Machines Corp., vol. 37, No. 4B. Apr. 1, 1994, 1 page.

* cited by examiner

PROVIDING CONTEXTUAL MENUS

BACKGROUND

Aspects of the disclosure relate to computer hardware and software. In particular, one or more aspects of the disclosure generally relate to computer hardware and software for providing contextual menus.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

SUMMARY

Aspects of the disclosure relate to various systems and techniques that provide more convenient, functional, and easy-to-use ways for users to interact with user interfaces provided by computing devices and/or computer software, particularly in instances in which a user is accessing and/or otherwise interacting with a menu, such as a contextual menu, that may, for instance, be presented in configuring and/or otherwise controlling a computing device and/or particular computer software.

For example, some embodiments discussed in greater detail below provide techniques for displaying a contextual menu in response to a drag-and-drop operation being completed. In some instances discussed below, the contextual menu may be a configuration menu that includes various sub-menus, options, and/or fields for defining and/or modifying various settings and/or preferences associated with the computing device and/or computer software being configured. Additionally or alternatively, the drag-and-drop operation may be completed, and the contextual menu may be displayed, as part of a configuration process being executed and/or provided on a computing device for a particular software package.

By leveraging various aspects of these techniques and/or the other features and functionalities discussed in more detail below, greater convenience, functionality, and ease-of-use may be provided to users of mobile devices, particularly in situations where these users wish to interact with a configuration process and/or an associated menu that includes various sub-menus, options, and/or fields.

Thus, in some embodiments discussed below, a computing device may receive user input. Subsequently, the computing device may determine, based on the received user input, that a drag-and-drop operation has been completed. In response to determining that the drag-and-drop operation has been completed, the computing device may cause a contextual menu to be displayed.

In some arrangements, the contextual menu may be a configuration menu. In additional and/or alternative arrangements, the drag-and-drop operation may include at least one item being dragged from a source palette to a target palette. In some instances, the size of the at least one item may be determined based on one or more factors. These factors may, for instance, include importance, complexity, and/or menu length. In other instances, the target palette may include one or more landing pads corresponding to one or more items included in the source palette. In still other instances, the source palette may include a predetermined number of items prior to initiation of the drag-and-drop operation. In yet other instances, an arrow may be displayed between the source palette and the target palette.

In some arrangements, causing the contextual menu to be displayed may include animating the contextual menu as a panel that slides into view from at least one edge of a displayed user interface. Additionally or alternatively, the contextual menu may include a first icon corresponding to a second icon associated with an item involved in the drag-and-drop operation.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing a contextual menu. Before discussing these concepts in greater detail, however, several examples of a computing device that may be used in implementing and/or otherwise providing various aspects of the disclosure will first be discussed with respect to FIG. 1.

Figure 1:
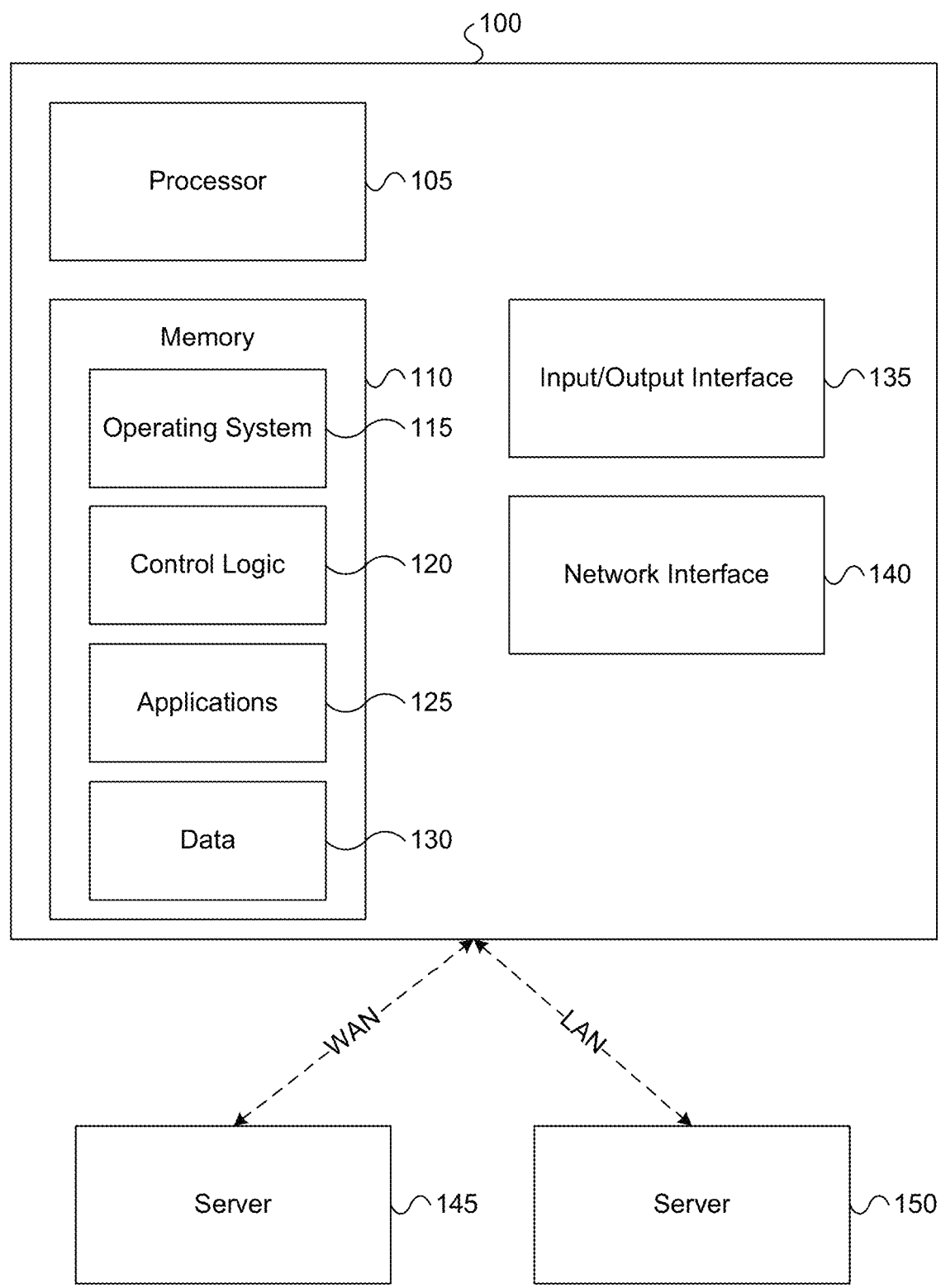
FIG. 1 depicts an example of a computing device that may be used in implementing one or more aspects of the disclosure in accordance with one or more illustrative aspects discussed herein.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audio-visual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing contextual menus. In the description below, various examples illustrating how a contextual menu may be provided in accordance with one or more embodiments will be discussed.

Figure 2:
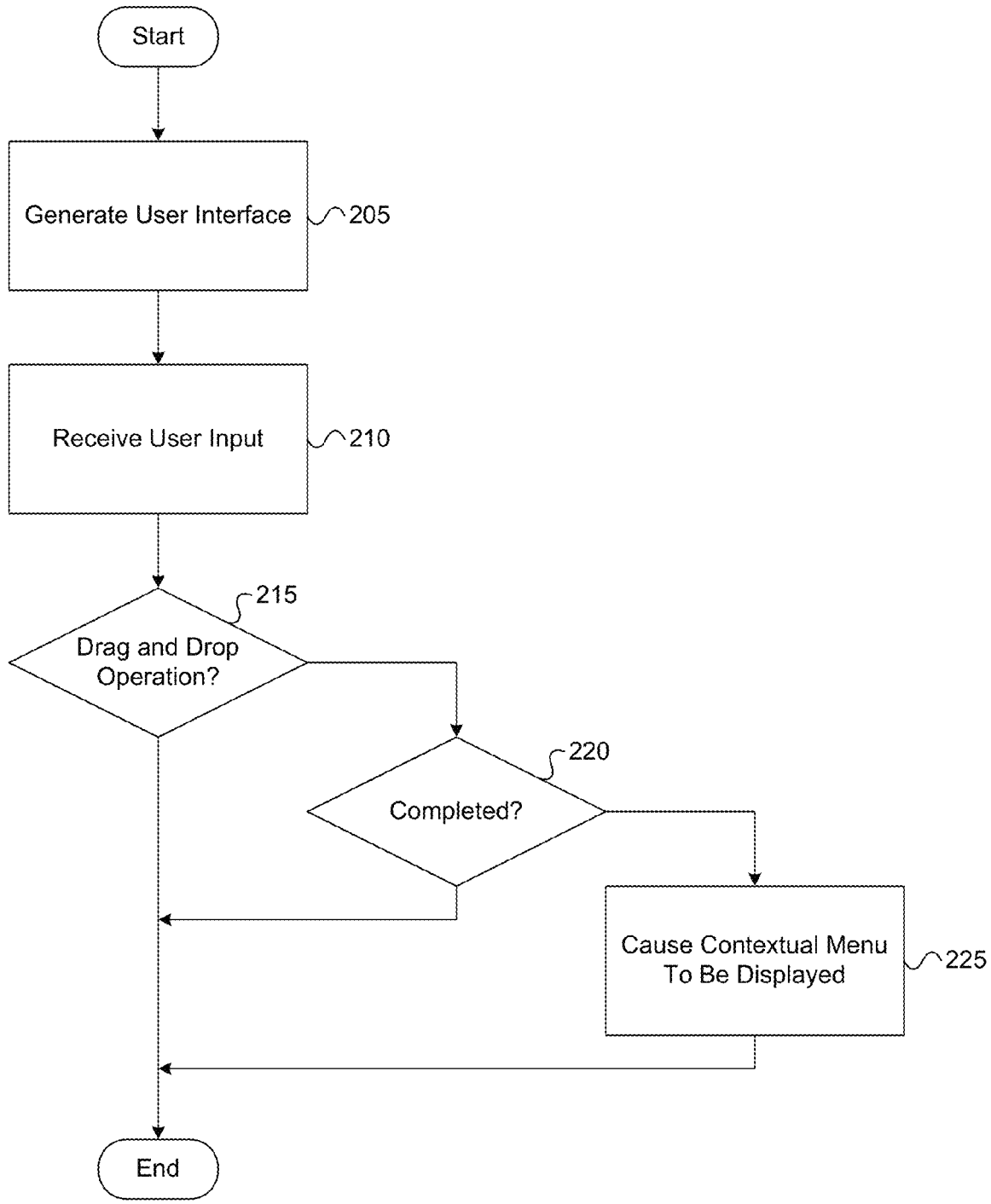
FIG. 2 depicts a flowchart that illustrates a method of providing a contextual menu in accordance with one or more illustrative aspects discussed herein.

FIG. 2 depicts a flowchart that illustrates a method of providing a contextual menu in accordance with one or more illustrative aspects discussed herein. In one or more embodiments, the method illustrated in FIG. 2 and/or one or more steps thereof may be performed by a computing device (e.g., generic computing device 100). Additionally or alternatively, the method illustrated in FIG. 2 and/or one or more steps thereof may, in some instances, be performed by a mobile device (which may implement one or more aspects of a computing device, such as generic computing device 100). In other embodiments, the method illustrated in FIG. 2 and/or one or more steps thereof may be embodied in computer-executable instructions that are stored in a computer-readable medium, such as a non-transitory computer-readable memory.

As seen in FIG. 2, the method may begin at step 205 in which a user interface may be generated. For example, in step 205, a computing device executing the method illustrated in FIG. 2 (e.g., computing device 100) may generate and/or display a graphical user interface. Such a user interface may include a source palette that includes a number of user-selectable items and a target palette where one or more of the items can be dropped. Additionally or alternatively, the graphical user interface may be displayed as part of a configuration process, as discussed below.

In step 210, the computing device (e.g., computing device 100) may receive user input. For example, the computing device may receive such user input via a mouse, touch screen, and/or the like.

In step 215, the computing device (e.g., computing device 100) may determine whether the user input includes and/or otherwise corresponds to a drag-and-drop operation. Such a drag-and-drop operation may, for example, include a user-selectable item being picked up from a source palette or other source area, and subsequently moved to, and released at, a target palette or other target area. If the user input includes and/or otherwise corresponds to a drag-and-drop operation, then in step 220, the computing device (e.g., computing device 100) may determine, based on the user input, whether the drag-and-drop operation has been completed. In determining whether the drag-and-drop operation has been completed, the computing device may, for instance, determine whether the item that has been picked up and moved (e.g., by the user of the computing device) has since been put down and released (e.g., by the user of the computing device).

If the computing device determines, in step 220, that the drag-and-drop operation was completed, then in step 225, the computing device (e.g., computing device 100) may cause a contextual menu to be displayed. For example, the computing device may display such a contextual menu on one or more display screens included in and/or connected to the computing device in response to determining that the drag-and-drop operation being completed.

In some instances, the computing device might only display such a contextual menu (e.g., in step 225) if the drag-and-drop operation is completed in a particular way. For instance, in the example discussed above in which the user interface includes a source palette and a target palette, the computing device may display a contextual menu if (and/or responsive to determining that) an item from the source palette has been dragged from the source palette and dropped onto the target palette. Yet, the computing device might not display such a contextual menu if (and/or responsive to determining that) the item was not dropped onto to the target palette (and instead was dropped at another area, for instance).

In some embodiments, the contextual menu that is displayed (e.g., the contextual menu that is displayed by the computing device in step 225) may be a configuration menu. Such a configuration menu may, for instance, be used in (and/or may be adapted to be used in) configuring the computing device, one or more other computing devices, and/or one or more software applications and/or packages (including software applications and/or packages that are executed on, or configured to be executed on, one or more other computing devices). For example, a source palette of user-selectable items and a target palette with one or more landing pads may, in some instances, be provided as part of a configuration process for a software package, such as a computer networking and/or virtualization software package. Based on (and/or responsive to) the initiation and/or completion of one or more drag-and-drop operations (e.g., involving one or more items being moved from the source palette to the target palette), the computing device may display a number of different contextual menus to enable configuration of various different aspects of the software package. In some instances, by displaying a contextual menu in this way (namely, responsive to a drag-and-drop operation, e.g., involving a user-selectable item being moved from a source palette to a target palette), an enhanced user experience can be provided to a user who is configuring the software package (or otherwise interacting with and/or using these functionalities). For example, these features may enhance user experience by creating the perception that the configuration process can be completed on a single screen. Additionally or alternatively, these features may enhance user experience by making the configuration process more user-friendly, manageable, and/or efficient, and further may allow the user to quickly assess what steps and/or items remain to be addressed in the configuration process.

In some instances, a contextual menu, such as a configuration menu, may be displayed and/or otherwise provided in response to a drag-and-drop operation during an initial use of a particular software package or application. These features can operate, in these instances, to inform and teach a user about the various different features and options available through the software package or application during its first use. Additionally or alternatively, such a contextual menu can also be displayed at other times, such as during subsequent configuration of the software package or application. For example, some or all of the user interface elements and/or functionalities associated with these features can be similarly implemented and used when allowing a user to modify settings and preferences that were previously defined. Furthermore, while some of the examples discussed herein involve presenting a contextual menu when configuring a software package, similar features and/or functionalities may be used in other instances and/or for other purposes. For example, in some instances, a contextual menu may be provided in accordance with various aspects of the disclosure when enabling a user to create and/or modify a search string or query.

As illustrated above, the drag-and-drop operation may, in some embodiments, include at least one item being dragged from a source palette to a target palette. In some instances, once an item is selected in the source palette (e.g., by a user providing user input corresponding to a selection of the item, such as a tap, click, etc.), the computing device may update the display to change the color of the item based on the selection. For instance, responsive to the selection, the item may be displayed in a highlight color (e.g., green) instead of in a non-highlight color (e.g., gray). Additionally or alternatively, while the item is being dragged from the source palette to the target palette, the item may continue to be displayed in the highlight color (e.g., instead of in the non-highlight color). As a result of this processing, the one or more items included in the source palette may, for instance, be displayed in a different color than the one or more items included in the target palette.

In some embodiments in which at least one item can be dragged from a source palette to a target palette, the source palette may include multiple user-selectable items, and each of the items can be dragged from the source palette to the target palette (e.g., to cause a different contextual menu to be displayed, where the particular contextual menu that is displayed corresponds to the particular item dragged to the target palette). In some instances, the one or more items included in the source palette may have the same shape (e.g., circles, squares, triangles, etc.), while in other instances, the one or more items included in the source palette may have different shapes (e.g., some circles, some squares, some triangles, etc.). Additionally or alternatively, the one or more items included in the source palette may each have an icon or other image, as well as an associated label or other text. In some instances, the one or more items included in the source palette may have the same size, while in other instances, the one or more items included in the source palette may have different sizes (e.g., such that some items are larger or smaller than other items).

In some embodiments, the size and/or shape of one or more items included in the source palette (and draggable to the target palette) may be determined based on one or more factors. These factors may, in some embodiments, include importance, complexity, and menu length. This importance may, for example, refer to the necessity and/or significance of the corresponding user-selectable item, as well as the necessity and/or significance of the contents and/or settings which are accessed and/or controlled by a contextual menu that is displayed when the corresponding item is dragged to and dropped on the target palette. Similarly, the complexity may, for example, refer to the level of detail involved in configuring (and/or the experience and/or skill needed to address) the contents and/or settings which are accessed and/or controlled by a contextual menu that is displayed when the corresponding user-selectable item is dragged to and dropped on the target palette. Additionally, the menu length may, for example, refer to the number of sub-menus, options, and/or configuration steps that are included in, accessed by, and/or controlled by a contextual menu that is displayed when the corresponding user-selectable item is dragged to and dropped on the target palette.

For example, a particularly complex or lengthy contextual menu may result in a particular, corresponding user-selectable item being displayed relatively larger and/or in a different shape (e.g., relative to other user-selectable items that are associated with relatively less complex or less lengthy configuration menus). As another example, if a certain contextual menu includes one or more portions that are required in order to complete a current process, a corresponding user-selectable item may be displayed as having a particular shape, size, and/or color (e.g., different from the other, non-required items). By providing visual cues in one or more of these ways, these features may enable a user to more quickly and easily assess how long and/or important certain parts of configuration process are and/or how long and/or important certain contextual menus may be in relation to other menus, parts, and/or sections.

In some embodiments in which at least one item can be dragged from a source palette to a target palette, the target area may include one or more landing pads, which each may function as a designated spot for dropping and/or otherwise placing an item dragged from the source palette. In some instances, each landing pad in the target palette may include an outline (e.g., in dotted lines) of a shape from the source palette. These features may help to inform the user about where particular items from the source palette can be dropped on the target palette. In some additional and/or alternative embodiments, landing pads might not be provided in the target palette. Instead, the user may be able to drop items from the source palette anywhere on the target palette, and the computing device may update the display to automatically arrange the items in a certain fashion (e.g., in a grid).

In some embodiments in which at least one item can be dragged from a source palette to a target palette, the source palette may have a predefined number of items prior to initiation of the drag-and-drop operation (e.g., prior to the user selecting and moving at least one of the items out of the source palette). For example, a source palette may, in some instances, have four user selectable items arranged in a square prior to initiation of a drag-and-drop operation, and each different item may correspond to a different contextual menu that may be displayed when the corresponding item is dropped in the target area. Any other number (e.g., two, three, five, etc.) and/or arrangement (e.g., circular, triangular, etc.) of user-selectable items could similarly be used in other instances. Additionally or alternatively, any and/or all of the user-selectable items may have various shapes, icons, and/or colors.

In some embodiments in which at least one item can be dragged from a source palette to a target palette, the source palette and/or the target palette may include one or more scroll bars (e.g., to allow the user to scroll through a larger number of selectable items that may be available). Additionally or alternatively, each item included in the source palette may include a label or other text content. In some instances, the label or other text content can move with an item and/or its corresponding graphical contents when the item is dragged and/or dropped. In other instances, the item and/or its corresponding graphical contents might move independently of the label or other text content associated with the item.

In some embodiments in which at least one item can be dragged from a source palette to a target palette, an arrow (and/or one or more other graphical indicators, such as a collection of arrows, one or more dotted lines, etc.) may be displayed and/or otherwise provided between the source palette and the target palette. By including such an arrow and/or other graphical indicator(s), the user interface may be made more intuitive for the user, as the arrow and/or the other graphical indicator(s) may suggest to the user that the items in the source palette can be dragged and/or dropped (e.g., on the target palette). In addition, in some instances in which an arrow is displayed between the source and target palettes, the arrow may have the same color as one or more highlighted and/or selected items in the user interface, such as a highlight color (e.g., green) matching the highlights of selected items in the source and/or target palettes, so as to encourage the user to drag and drop items from the source palette to the target palette and to generally make the user interface more intuitive for the user.

In some embodiments, a contextual menu that is displayed by the computing device (e.g., the contextual menu that is displayed by the computing device in step 225 in response to completion of the drag-and-drop operation), may be displayed as a panel. For example, the menu may be displayed as a panel along at least one edge of the user interface and/or display screen, and the user of the computing device may be able to show and/or hide the panel by interacting with one or more controls included in and/or near the panel. In some embodiments in which the contextual menu can be displayed as a panel, causing the contextual menu to be displayed (e.g., in step 225 of the example method illustrated in FIG. 2) may include animating the contextual menu as a panel that slides into view from at least one edge of a displayed user interface. For example, responsive to the drag-and-drop operation being completed, the computing device may render and/or display the contextual menu as a panel that moves linearly into view from a hidden and/or otherwise non-displayed portion of a display screen or user interface in which the drag-and-drop operation was completed.

In some embodiments in which a contextual menu is displayed responsive to an item being dragged and dropped in a particular area, such as a target palette, the contextual menu may include an icon that corresponds to the icon associated with the item involved in the drag-and-drop operation. For example, if the item has a lock item when it is dragged from a source palette and dropped on a target palette, then a contextual menu that is displayed in response to the drag-and-drop operation may also include a lock icon. These features may, for instance, provide context to the user about what items, settings, and/or processes are being configured through the particular contextual menu that is displayed.

In some additional and/or alternative embodiments, after a contextual menu is displayed responsive to a drag-and-drop operation, the displayed contextual menu itself may include a source palette with additional user-selectable items and a target palette where these additional items can be dropped. Furthermore, responsive to these items being dropped in the target palette within the contextual menu, an additional contextual menu may be displayed (e.g., allowing for configuration of various different settings and/or options). In other instances, the displayed contextual menu may include one or more tiles with additional configuration options that can be defined and/or modified by the user of the computing device. In still other instances, after using a number of drag-and-drop operations and one or more corresponding contextual menus to configure various aspects of a software application and/or a computing device during an initial use of the software application and/or the computing device, similar drag-and-drop operations and similar contextual menus may be subsequently displayed during later uses of the software application and/or the computing device to facilitate changes in user preferences and/or settings. By once again presenting settings and menus in this way (e.g., in a style similar to the style used during initial configuration of the software application and/or the computing device), after the software application is already in use, the user interface and/or the computing device can provide the user with a more unified, consistent, and/or familiar user experience when using the software application and/or the computing device.

Having discussed a number of features and functionalities that may be implemented and/or otherwise used in various embodiments, several user interfaces that illustrate some features of various embodiments will now be discussed with respect to FIGS. 3-12. In particular, FIGS. 3-12 depict example user interfaces that may be displayed in providing a contextual menu in accordance with one or more illustrative aspects discussed herein. In some embodiments, any and/or all of the example user interfaces illustrated in FIGS. 3-12 may be displayed by a computing device, such as computing device 100. Additionally, as seen in FIGS. 3-12, various aspects of the disclosure can be implemented in configuring a computer system and/or software package in one or more embodiments. For instance, in the examples illustrated in FIGS. 3-12, a mobile device management system is being configured, and various policies, preferences, features, and settings associated with the system are being created, defined, and/or modified. In other instances, similar user interface features and/or other aspects of the disclosure may be employed in configuring additional and/or alternative systems and/or different types of systems.

Figure 3:
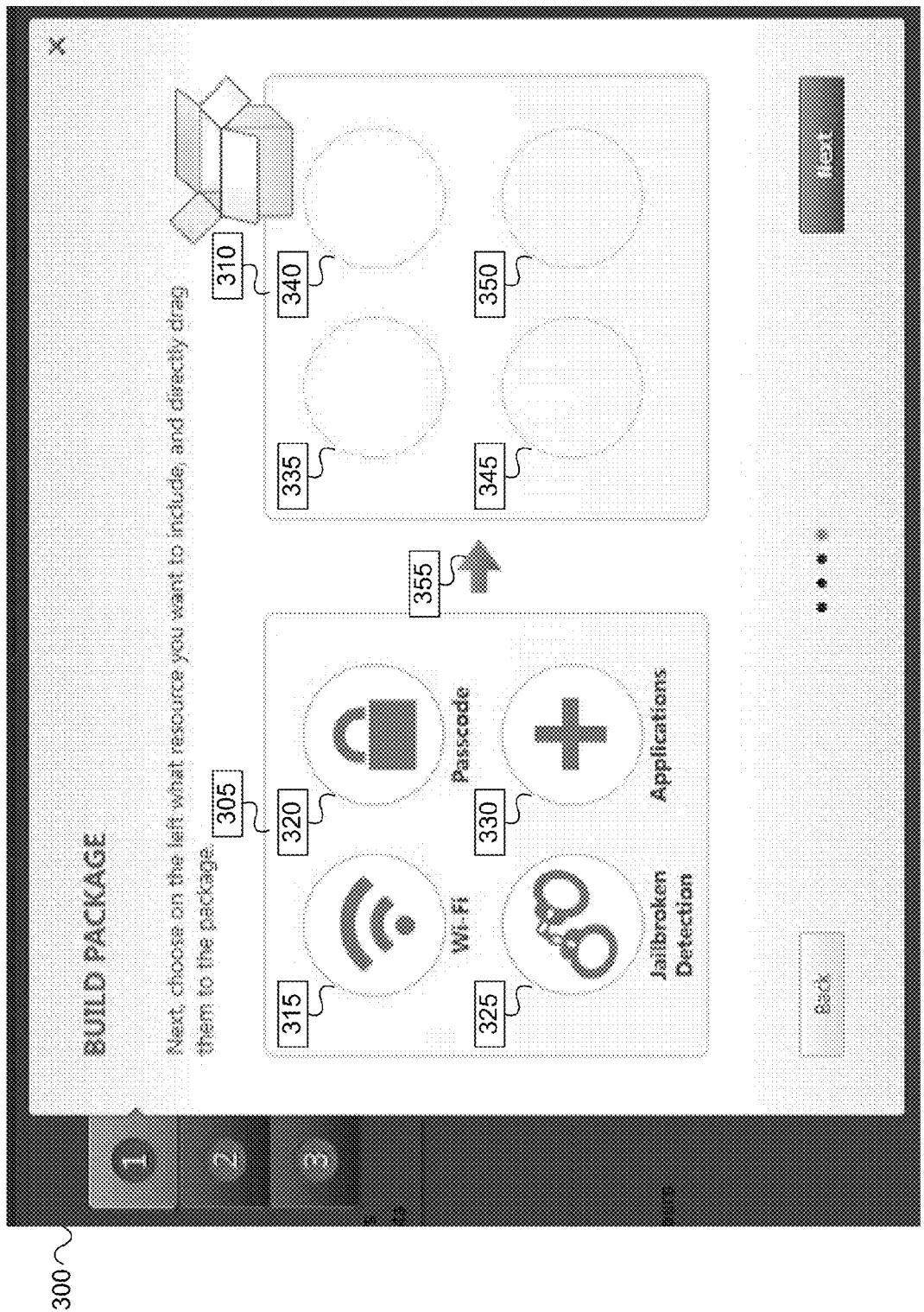
FIGS. 3-12 depict example user interfaces that may be displayed in providing a contextual menu in accordance with one or more illustrative aspects discussed herein.

Beginning with FIG. 3, an example user interface 300 is illustrated that shows how various aspects of the disclosure may be presented and/or otherwise provided by a computing device. As seen in FIG. 3, user interface 300 includes a source palette 305 and a target palette 310. In addition, as also seen in the example illustrated in FIG. 3, user interface 300 can be used, in some instances, in a process in which a software package and/or a computing device is configured by a user (e.g., during an initial use and/or deployment of such a software package).

Furthermore, in the illustrated example, the source palette 305 of user interface 300 includes a number of user-selectable items, including items 315, 320, 325, and 330. Each of these items can be dragged and dropped (e.g., from source palette 305 into target palette 310) in order to cause a corresponding contextual menu to be displayed, in accordance with various aspects of the disclosure discussed above. Target palette 310 also includes a number of landing pads, including landing pads 335, 340, 345, and 350. In the illustrated example, user interface 300 also includes an arrow 355. As discussed above, such an arrow can help to inform a user that the items included in source palette 305 can be dragged and dropped into target palette 310, so as to make the user interface 300 more intuitive and easy-to-use.

Figure 4:
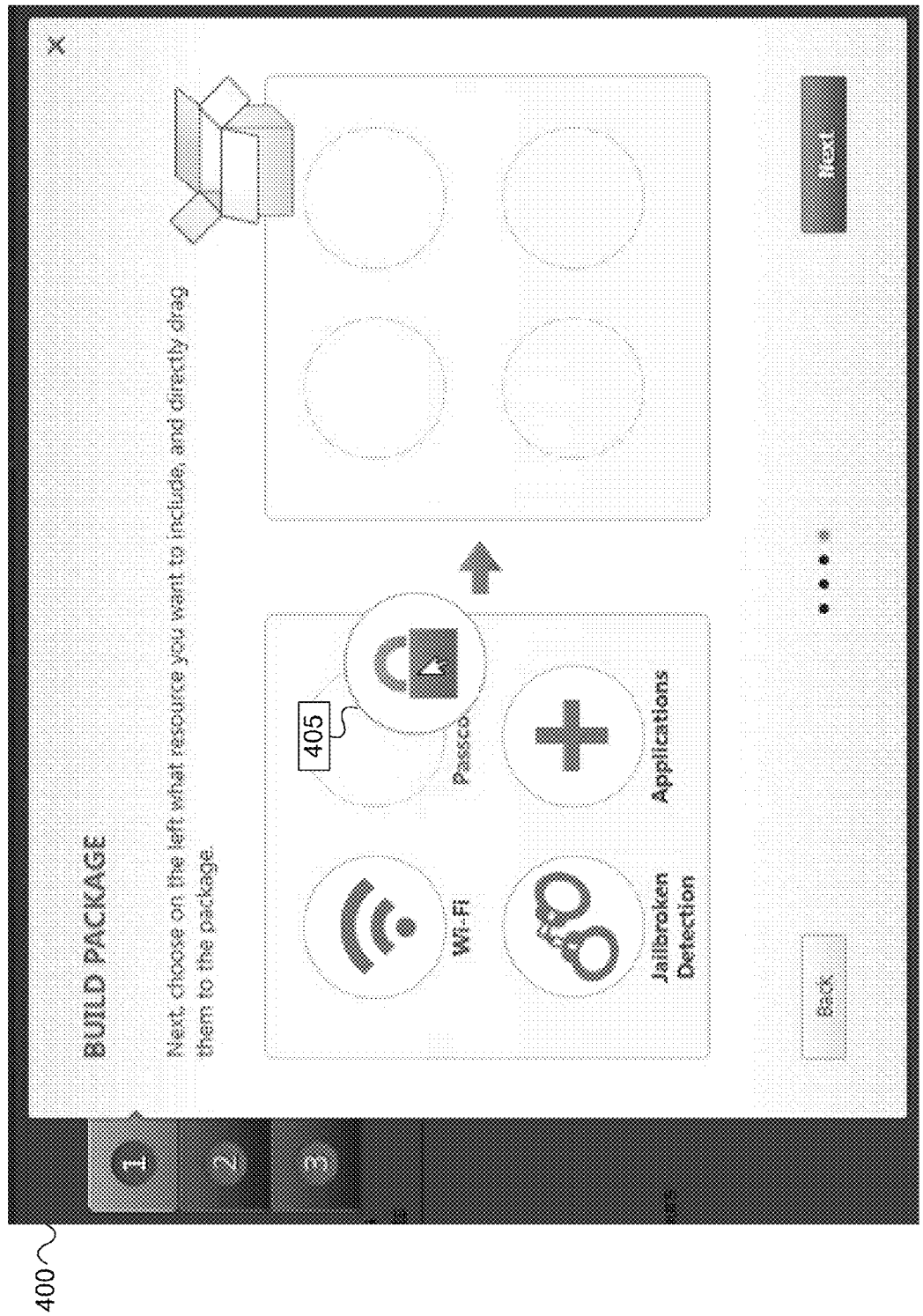

Turning now to FIG. 4, an example user interface 400 is illustrated in which an item 405 from the source palette has been selected. In addition, a drag-and-drop operation has been initiated, but not yet completed. In the illustrated example, item 405 corresponds to item 320 shown in the previous screen (namely, user interface 300 shown in FIG. 3).

Figure 5:
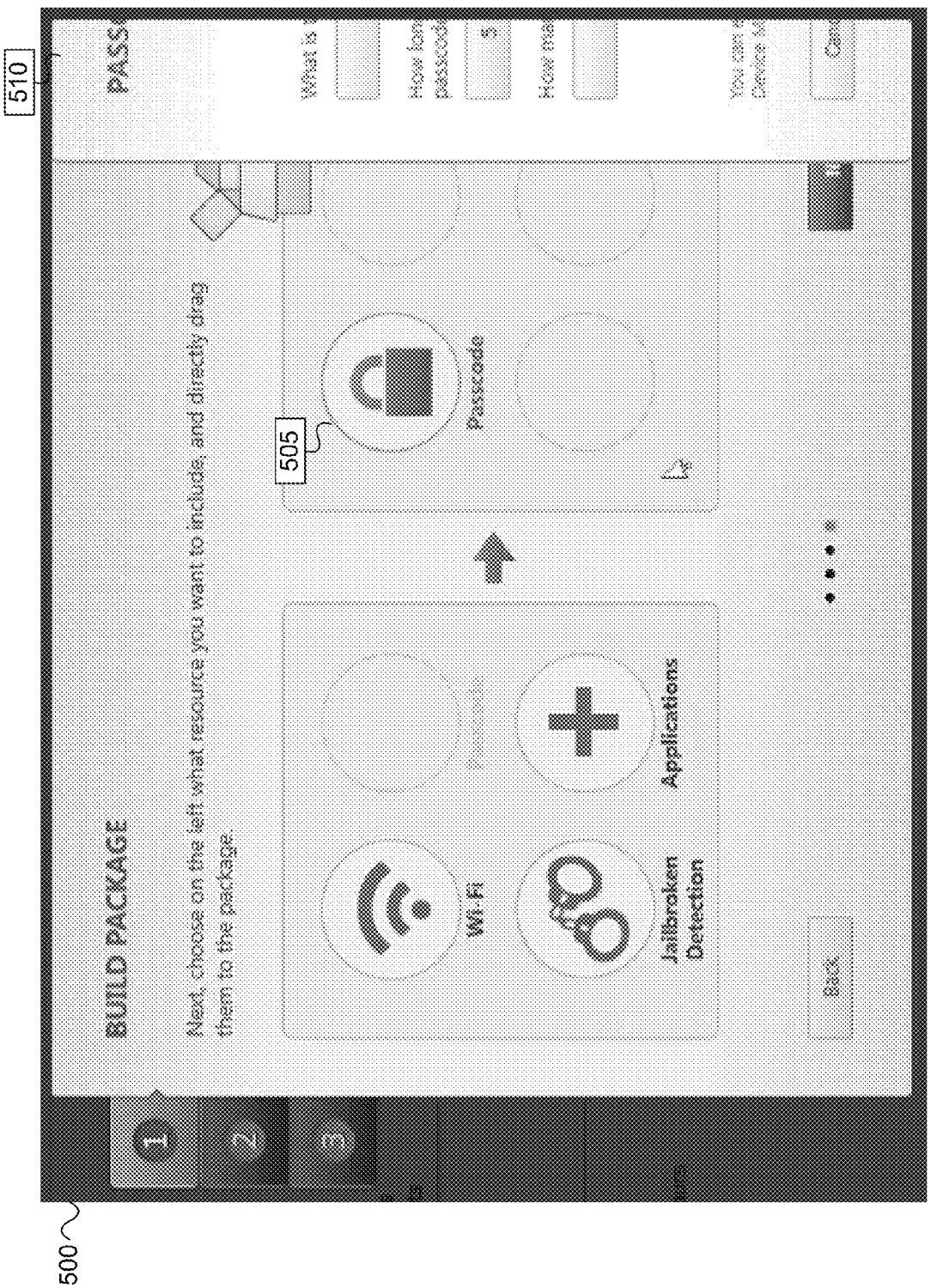

Next, turning to FIG. 5, which illustrates an example user interface 500, the drag-and-drop operation (which was shown as being initiated in FIG. 4) has been completed. In particular, item 505 (which corresponds to item 405 shown in the previous screen) has been dropped in the target palette. In addition, a contextual menu 510 is beginning to be revealed. More particularly, in the example illustrated in FIG. 5, the computing device is in the process of animating contextual menu 510 as a panel that is sliding into view from the left edge of user interface 500.

Figure 6:
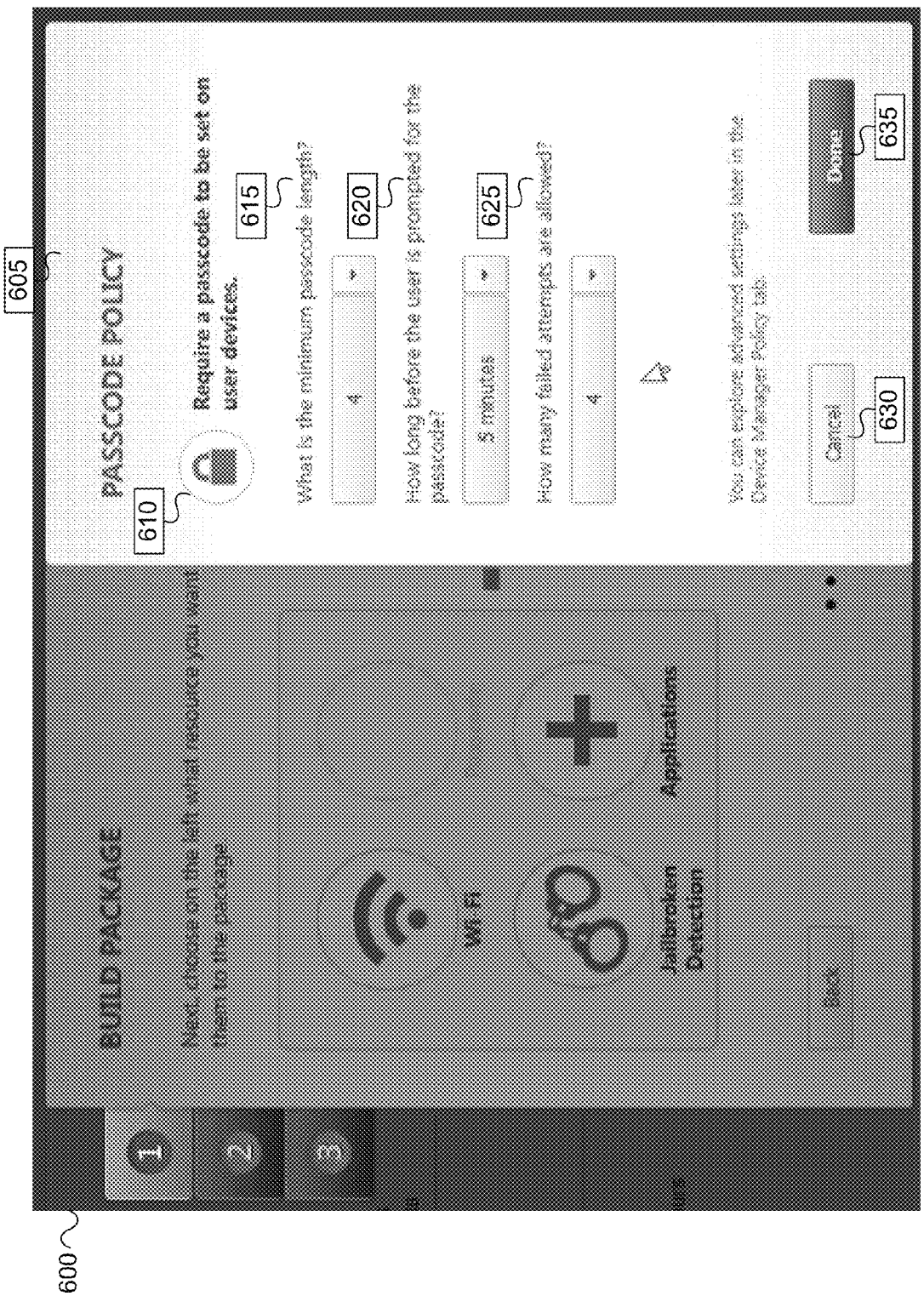
Figure 7:
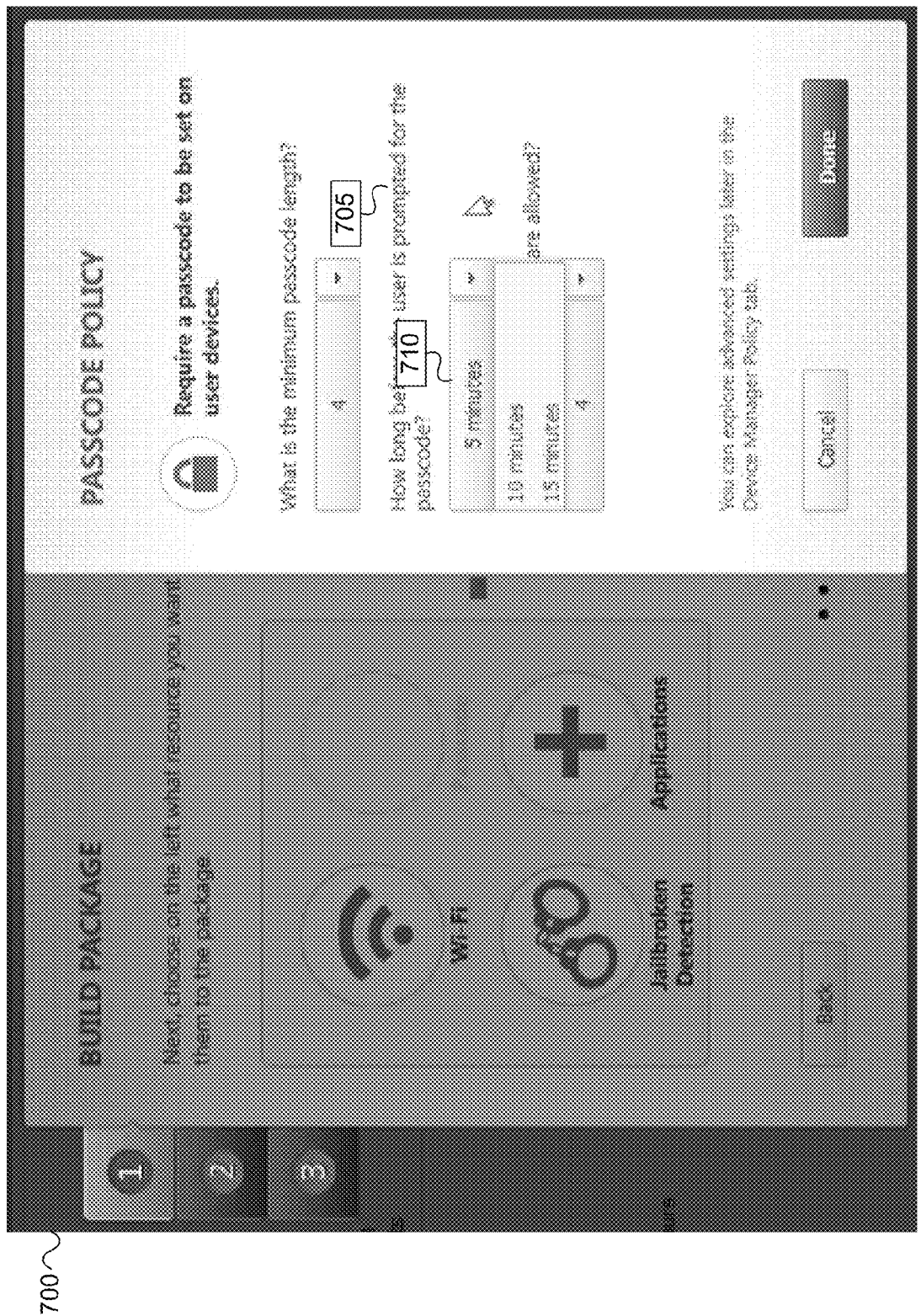

Turning now to FIG. 6, which illustrates an example user interface 600, a contextual menu 605 (which corresponds to contextual menu 510 shown in the previous screen) has been fully displayed. More particularly, the animation process that was in progress in the example illustrated in FIG. 5 has been completed in the example illustrated in FIG. 6, with contextual menu 605 now being fully accessible and displayed in user interface 600.

In addition, in the example illustrated in FIG. 6, contextual menu 605 includes an icon 610 that corresponds to the icon associated with the item involved in the drag-and-drop operation that caused contextual menu 605 to be displayed. In particular, icon 610 corresponds to the icon associated with item 505, which was dropped in the target palette in the examples illustrated above. Furthermore, in the example illustrated in FIG. 6, contextual menu 605 includes a number of sub-menus, options, and controls, including pull-down menus 615, 620, and 625, as well as buttons 630 and 635. By interacting with one or more of these aspects of contextual menu 605, a user may be able to create and/or define various settings, which may, for instance, be set during a configuration process. In particular, turning now to FIG. 7, which illustrates an example user interface 700, a user may interact with pull-down menu 705 (which corresponds to pull-down menu 620 shown in the previous screen) to select one or more options 710 in order to create and/or define various settings during the configuration process.

Figure 8:
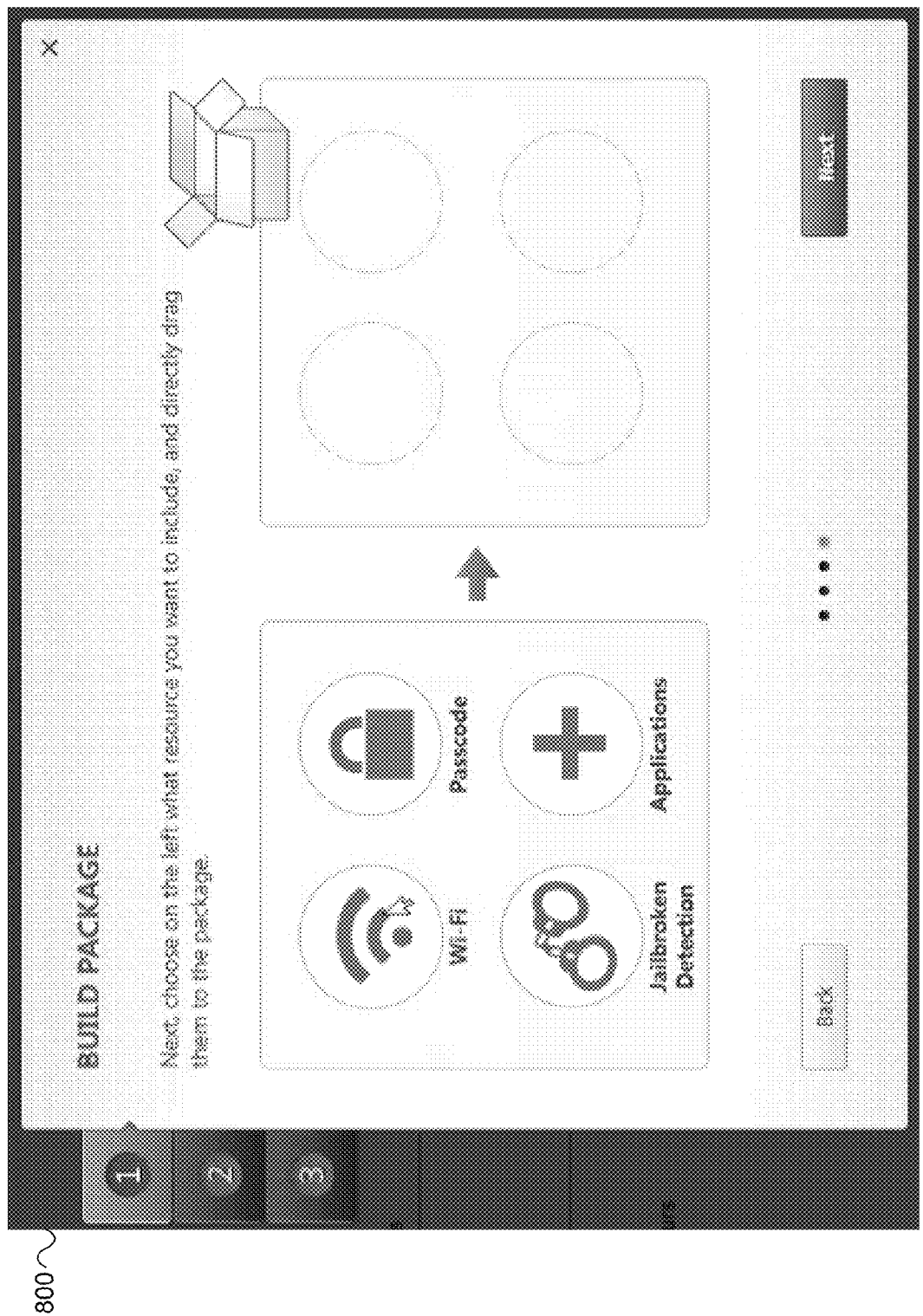
Figure 9:
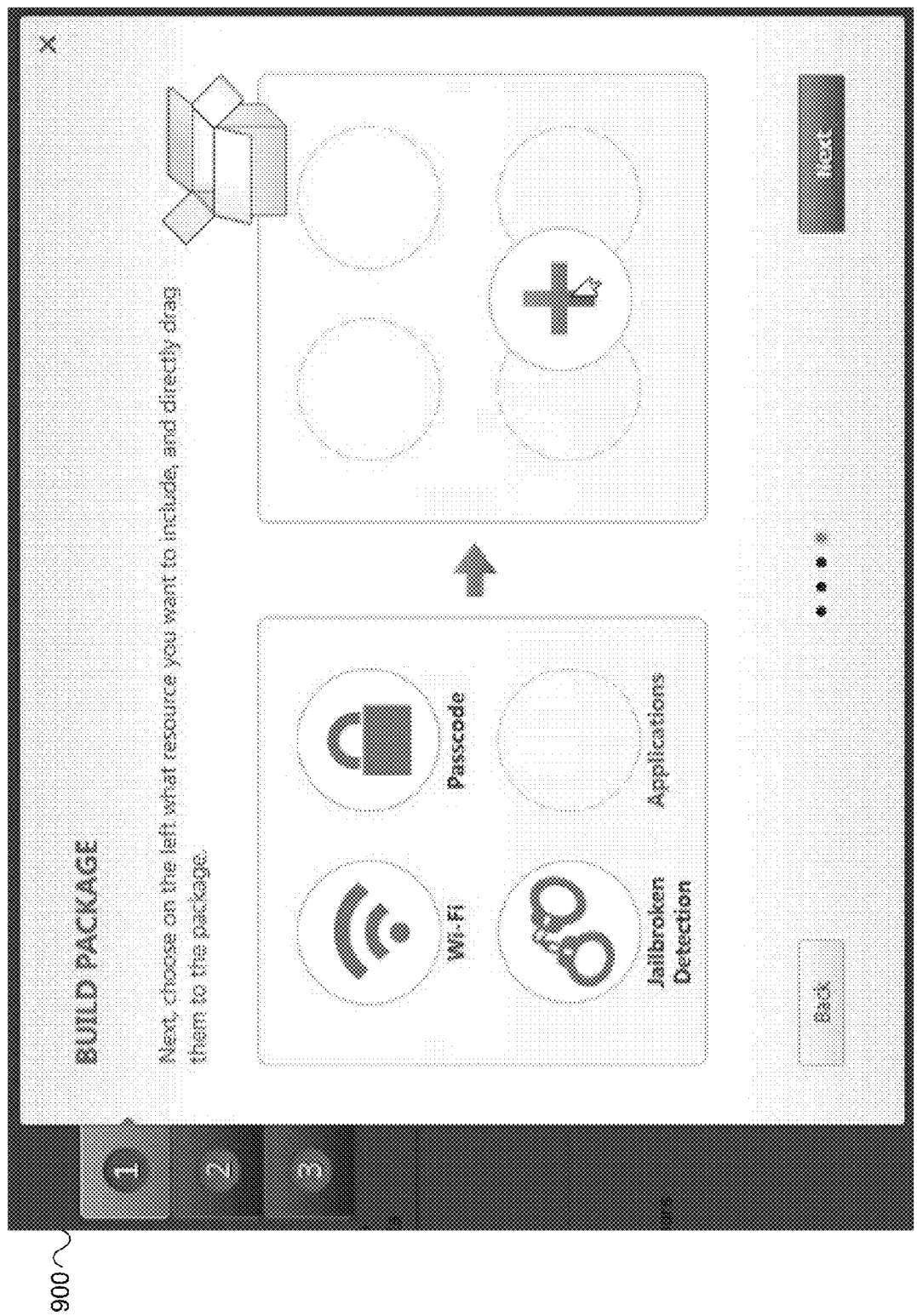
Figure 10:
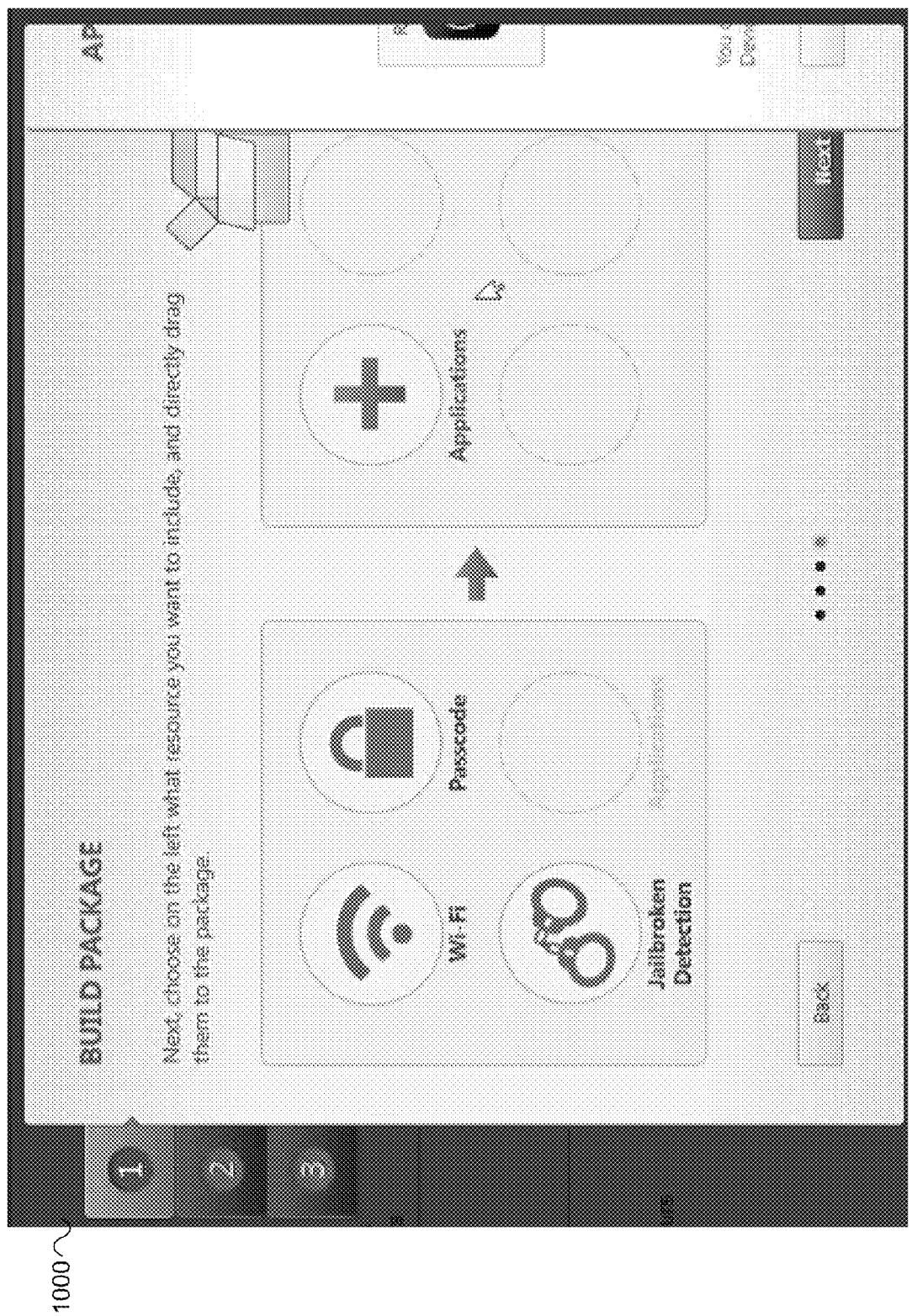
Figure 11:
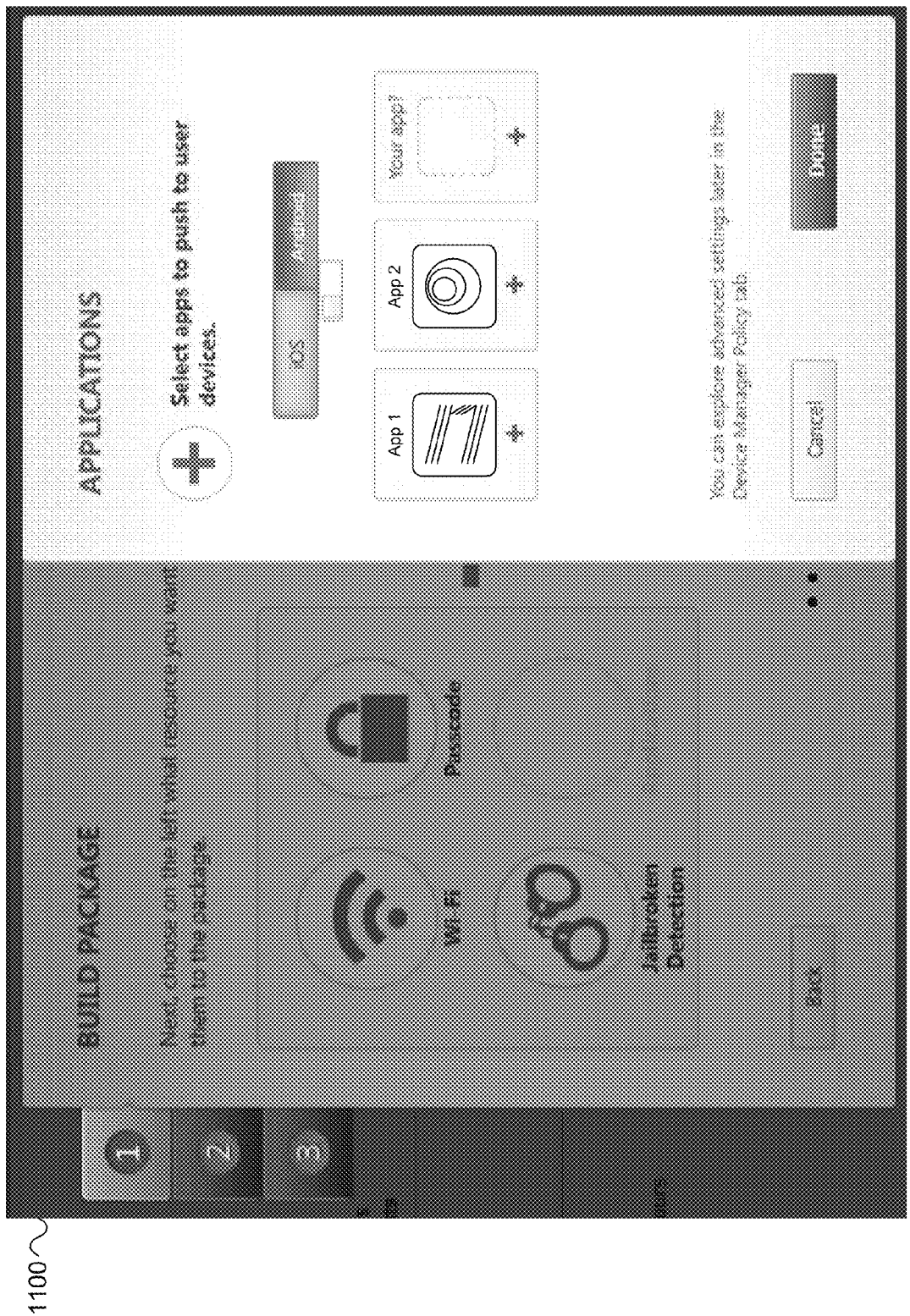
Figure 12:
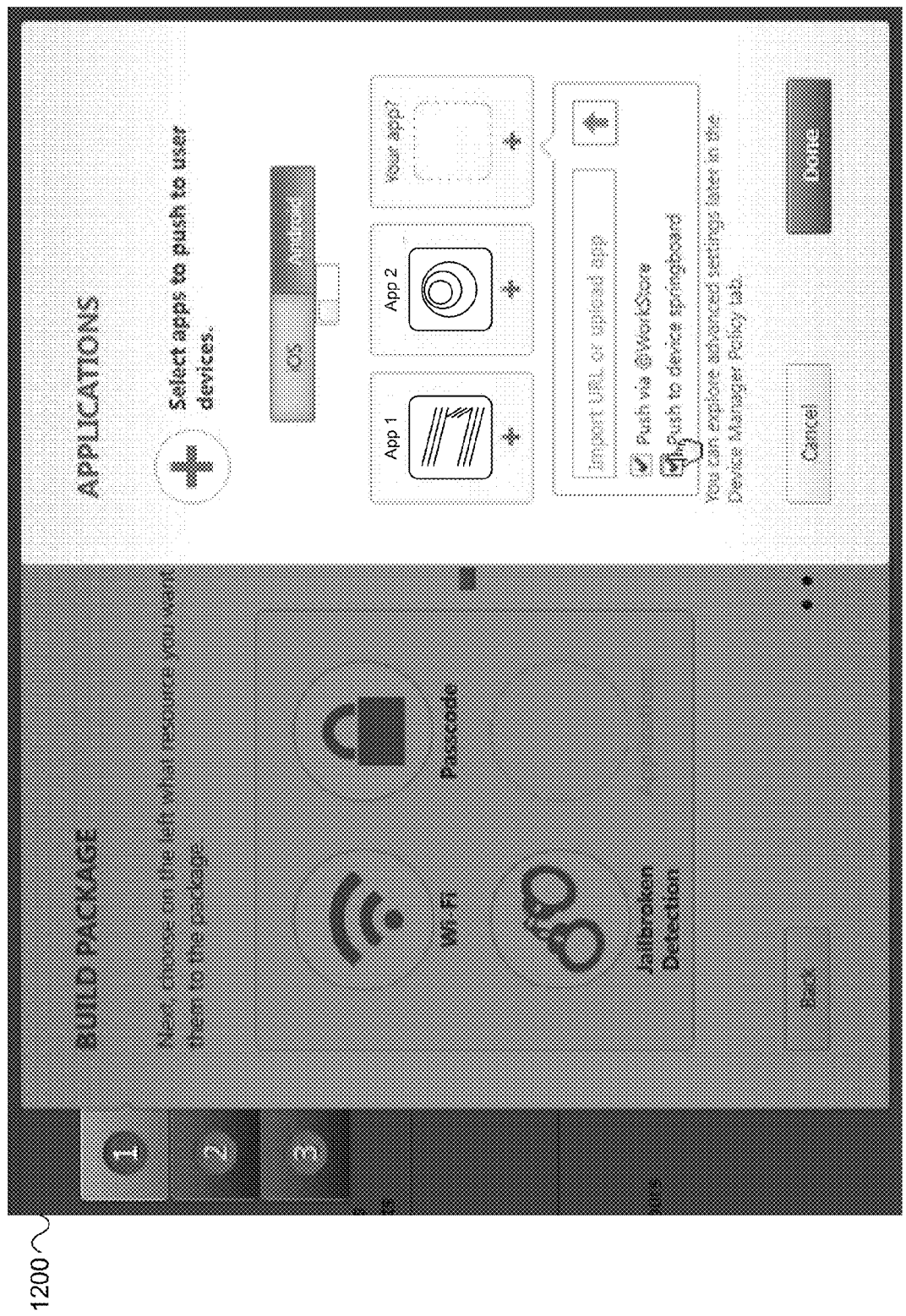

Another example illustrating how a contextual menu may be displayed in response to a drag-and-drop operation is depicted in FIGS. 8-12. In particular, as seen in FIG. 8, which illustrates an example user interface 800, a source palette with a number of user-selectable items and a target palette with a number of landing pads may be displayed by a computing device (e.g., computing device 100). In FIG. 9, which illustrates an example user interface 900, a user of the computing device has selected an item from the source palette and initiated a drag-and-drop operation (which has not yet been completed) to move an "Applications" item from the source palette to the target palette. In FIG. 10, which illustrates an example user interface 1000, the user of the computing device has dropped the "Applications" item in the target palette, thereby completing the drag-and-drop operation. In accordance with various aspects of the disclosure, the computing device is causing a contextual menu to be displayed using an animation, where the contextual menu corresponds to the "Applications" item involved in the drag-and-drop operation. In FIG. 11, which illustrates an example user interface 1100, the computing device has finished rendering and displaying the animation shown in the previous screen, and the contextual menu corresponding to the "Applications" item is fully displayed in the user interface. In addition, as seen in FIG. 11, the contextual menu being displayed also includes an icon corresponding to the icon associated with the "Applications" item involved in the drag-and-drop operation, so as to provide context to the user about what set of options is being configured. Additionally, the contextual menu includes a number of sub-menus, options, and controls, including several tiles, that allow the user to create and/or modify various settings related to "Applications" aspects of the configuration process. In FIG. 12, which illustrates an example user interface 1200, the user of the computing device has selected one of the tiles included in the contextual menu associated with the "Applications" item, and the selection of the tile has resulted in additional options and controls being displayed in the contextual menu.

As illustrated above, various aspects of the disclosure relate to providing contextual menus, particularly in response to drag-and-drop operations that are initiated and completed by a user of a computing device. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
receiving, by a computing device, first user input;
determining, by the computing device, based on the first user input, that a first drag-and-drop operation has been completed, the first drag-and-drop operation including a first item being dragged from a source palette to a target palette;
causing, by the computing device, a first contextual menu associated with the first item to be displayed in response to determining that the first drag-and-drop operation has been completed by animating the first contextual menu as a first panel that slides into view from at least one edge of a displayed user interface, the first contextual menu being a first configuration menu for configuring a software package, and the first contextual menu comprising a first set of controls for modifying first settings of the software package corresponding to the first item;
receiving, by the computing device, second user input;
determining, by the computing device, based on the second user input, that a second drag-and-drop operation has been completed, the second drag-and-drop operation including a second item being dragged from the source palette to the target palette, the second item being different from the first item; and
causing, by the computing device, a second contextual menu associated with the second item to be displayed in response to determining that the second drag-and-drop operation has been completed by animating the second contextual menu as a second panel that slides into view from the at least one edge of the displayed user interface, the second contextual menu being a second configuration menu for configuring the software package different from the first configuration menu for configuring the software package, and the second contextual menu comprising a second set of controls for modifying second settings of the software package corresponding to the second item different from the first set of controls for modifying the first settings of the software package corresponding to the first item.

2. The method of claim 1, wherein a size of the first item is determined based on one or more factors.

3. The method of claim 2, wherein the one or more factors include at least one of importance, complexity, and menu length.

4. The method of claim 1, wherein the target palette includes one or more landing pads corresponding to one or more items included in the source palette.

5. The method of claim 4, wherein the target palette includes a first landing pad corresponding to the first item and a second landing pad corresponding to the second item.

6. The method of claim 5, wherein the first landing pad includes an outline of a shape of the first item and the second landing pad includes an outline of a shape of the second item.

7. The method of claim 1, wherein the source palette includes a predetermined number of items prior to initiation of the drag-and-drop operation.

8. The method of claim 1, wherein an arrow is displayed between the source palette and the target palette.

9. The method of claim 1,
wherein the first contextual menu includes a first icon corresponding to a second icon associated with the first item involved in the first drag-and-drop operation, and
wherein the second contextual menu includes a third icon corresponding to a fourth icon associated with the second item involved in the second drag-and-drop operation.

10. The method of claim 1, wherein a size of the first item in the source palette is determined based on a level of detail involved in configuring one or more settings of the software package that are accessed via the first contextual menu when the first item is dragged from the source palette to the target palette.

11. One or more non-transitory computer-readable media having computer-executable instructions stored thereon that, when executed, cause at least one computing device to:
receive first user input;
determine, based on the first user input, that a first drag-and-drop operation has been completed, the first drag-and-drop operation including a first item being dragged from a source palette to a target palette;
cause a first contextual menu associated with the first item to be displayed in response to determining that the first drag-and-drop operation has been completed by animating the first contextual menu as a first panel that slides into view from at least one edge of a displayed user interface, the first contextual menu being a first configuration menu for configuring a software package, and the first contextual menu comprising a first set of controls for modifying first settings of the software package corresponding to the first item;
receive second user input;
determine, based on the second user input, that a second drag-and-drop operation has been completed, the second drag-and-drop operation including a second item being dragged from the source palette to the target palette, the second item being different from the first item; and
cause a second contextual menu associated with the second item to be displayed in response to determining that the second drag-and-drop operation has been completed by animating the second contextual menu as a second panel that slides into view from the at least one edge of the displayed user interface, the second contextual menu being a second configuration menu for configuring the software package different from the first configuration menu for configuring the software package, and the second contextual menu comprising a second set of controls for modifying second settings of the software package corresponding to the second item different from the first set of controls for modifying the first settings of the software package corresponding to the first item.

12. The one or more non-transitory computer-readable media of claim 11, wherein a size of the first item is determined based on one or more factors, the one or more factors including at least one of importance, complexity, and menu length.

13. The one or more non-transitory computer-readable media of claim 11, wherein the target palette includes one or more landing pads corresponding to one or more items included in the source palette.

14. The one or more non-transitory computer-readable media of claim 11, wherein an arrow is displayed between the source palette and the target palette.

15. The one or more non-transitory computer-readable media of claim 11,
wherein the first contextual menu includes a first icon corresponding to a second icon associated with the first item involved in the first drag-and-drop operation, and
wherein the second contextual menu includes a third icon corresponding to a fourth icon associated with the second item involved in the second drag-and-drop operation.

16. A system, comprising:
at least one processor; and
memory storing computer-readable instructions that, when executed by the at least one processor, cause the system to:
receive first user input;
determine, based on the first user input, that a first drag-and-drop operation has been completed, the first drag-and-drop operation including a first item being dragged from a source palette to a target palette;
cause a first contextual menu associated with the first item to be displayed in response to determining that the first drag-and-drop operation has been completed by animating the first contextual menu as a first panel that slides into view from at least one edge of a displayed user interface, the first contextual menu being a first configuration menu for configuring a software package, and the first contextual menu comprising a first set of controls for modifying first settings of the software package corresponding to the first item;
receive second user input;
determine, based on the second user input, that a second drag-and-drop operation has been completed, the second drag-and-drop operation including a second item being dragged from the source palette to the target palette, the second item being different from the first item; and
cause a second contextual menu associated with the second item to be displayed in response to determining that the second drag-and-drop operation has been completed by animating the second contextual menu as a second panel that slides into view from the at least one edge of the displayed user interface, the second contextual menu being a second configuration menu for configuring the software package different from the first configuration menu for configuring the software package, and the second contextual menu comprising a second set of controls for modifying second settings of the software package corresponding to the second item different from the first set of controls for modifying the first settings of the software package corresponding to the first item.

17. The system of claim 16, wherein the target palette includes one or more landing pads corresponding to one or more items included in the source palette.

18. The system of claim 16, wherein a size of the first item is determined based on one or more factors.

19. The system of claim 18, wherein the one or more factors include at least one of importance, complexity, and menu length.

20. The system of claim 16, wherein the source palette includes a predetermined number of items prior to initiation of the drag-and-drop operation.

* * * * *